(12) United States Patent
Tohriyama et al.

(10) Patent No.: US 10,807,602 B2
(45) Date of Patent: Oct. 20, 2020

(54) EVALUATING APPARATUS

(71) Applicants: Toyota Jidosha Kabushiki Kaisha, Toyota-shi, Aichi-ken (JP); The University of Tokyo, Bunkyo-ku, Tokyo (JP)

(72) Inventors: Kyoichi Tohriyama, Yokohama (JP); Takuma Ito, Tokyo-to (JP); Masatsugu Soya, Tokyo-to (JP); Minoru Kamata, Tokyo-to (JP)

(73) Assignees: Toyota Jidosha Kabushiki Kaisha, Toyota-shi, Aichi-ken (JP); The University of Tokyo, Bunkyo-ku, Tokyo (JP)

( * ) Notice: Subject to any disclaimer, the term of this patent is extended or adjusted under 35 U.S.C. 154(b) by 0 days.

(21) Appl. No.: 16/797,594

(22) Filed: Feb. 21, 2020

(65) Prior Publication Data

US 2020/0273339 A1    Aug. 27, 2020

(30) Foreign Application Priority Data

Feb. 27, 2019   (JP) ................................ 2019-033799

(51) Int. Cl.
*B60W 40/06* (2012.01)
*B60W 40/09* (2012.01)
*B60W 30/095* (2012.01)
*G08G 1/16* (2006.01)

(52) U.S. Cl.
CPC ........ *B60W 40/06* (2013.01); *B60W 30/0956* (2013.01); *B60W 40/09* (2013.01); *G08G 1/16* (2013.01)

(58) Field of Classification Search
CPC .............. B60W 30/08; B60W 30/095; B60W 30/0953; B60W 30/0956; B60W 40/02; B60W 40/04; B60W 40/06; B60W 40/08; B60W 40/09; G08G 1/16
See application file for complete search history.

(56) References Cited

U.S. PATENT DOCUMENTS

| 2007/0225882 | A1* | 9/2007 | Yamaguchi ......... B60W 30/095 701/36 |
| 2013/0113910 | A1* | 5/2013 | Kim ...................... B60K 28/06 348/77 |
| 2016/0086285 | A1* | 3/2016 | Jordan Peters .. G08G 1/096827 705/4 |

(Continued)

FOREIGN PATENT DOCUMENTS

JP        2018-032343 A      3/2018

*Primary Examiner* — Andrew W Bee
(74) *Attorney, Agent, or Firm* — Dinsmore & Shohl LLP

(57) ABSTRACT

An evaluating apparatus is configured to evaluate a risk that exists in surroundings of a road on which a vehicle travels. The evaluating apparatus is provided with: a first determinator configured to determine a first risk value indicating an extent of a risk in one section of the road, on the basis of a feature value indicating driving behavior of a driver of the vehicle; a second determinator configured to determine a second risk value indicating an extent of a risk in the one section, on the basis of surrounding information about the surroundings of the road; and an acquirer configured to obtain reliability of the second risk value, by evaluating the second risk value by using the first risk value.

2 Claims, 11 Drawing Sheets

(56) References Cited

U.S. PATENT DOCUMENTS

| | | | |
|---|---|---|---|
| 2016/0167652 A1* | 6/2016 | Slusar | B60W 30/143 |
| | | | 701/27 |
| 2016/0189068 A1* | 6/2016 | Amano | G08G 1/0133 |
| | | | 705/7.28 |
| 2017/0066450 A1* | 3/2017 | Ko | B60W 30/10 |
| 2018/0239359 A1* | 8/2018 | Jian | B60W 50/14 |

* cited by examiner

FIG. 4

|  | FEATURE VALUE 1 | FEATURE VALUE 2 | FEATURE VALUE 3 | CLASSIFICATION CLUSTER |
|---|---|---|---|---|
| ID1 1st | −0.45 | −1.83 | −0.89 | CLUSTER 1 |
| ID1 2nd | 0.98 | 0.23 | 0.38 | CLUSTER 2 |
| ID1 3rd | 1.28 | −0.19 | 0.94 | CLUSTER 1 |
| ID2 1st | 0.87 | −0.48 | 0.27 | CLUSTER 2 |
| ID2 2nd | 1.01 | 2.53 | 3.04 | CLUSTER 2 |
| ID2 3rd | 0.78 | −0.05 | 1.06 | CLUSTER 1 |
| ID3 1st | 1.07 | 0.66 | 1.00 | CLUSTER 3 |
| ID3 2nd | 0.81 | 0.19 | 0.97 | CLUSTER 3 |
| ID3 3rd | 0.98 | −0.19 | 0.04 | CLUSTER 3 |
| ⋮ | ⋮ | ⋮ | ⋮ | ⋮ |

| | FEATURE VALUE 1 AVERAGE | FEATURE VALUE 2 AVERAGE | FEATURE VALUE 3 AVERAGE | OVERALL AVERAGE |
|---|---|---|---|---|
| CLUSTER 1 AVERAGE | −0.09 | −0.08 | 0.002 | −0.05 |
| CLUSTER 2 AVERAGE | 0.80 | 0.37 | 0.81 | 0.66 |
| CLUSTER 3 AVERAGE | 0.80 | 0.16 | 0.05 | 0.34 |

| | RANK |
|---|---|
| CLUSTER 1 | 3 |
| CLUSTER 2 | 1 |
| CLUSTER 3 | 2 |

FIG. 6

| ID | 1st | 2nd | 3rd | DRIVER TYPE ACCORDING TO THE POINT |
|---|---|---|---|---|
| 1 | 3 | 3 | 3 | 3 |
| 2 | 2 | 2 | 2 | 2 |
| 3 | 2 | 2 | 1 | 2 |
| 4 | 3 | 2 | 3 | 3 |
| 5 | 3 | 1 | 1 | 1 |
| ⋮ | ⋮ | ⋮ | ⋮ | ⋮ |

FIG. 7

| ID | LOCATION 1 | LOCATION 2 | LOCATION 3 | LOCATION 4 | DRIVER TYPE |
|---|---|---|---|---|---|
| 1 | 3 | 3 | 3 | 3 | 3 |
| 2 | 2 | 2 | 1 | 2 | 2 |
| 3 | 2 | 1 | 1 | 1 | 1 |
| 4 | 3 | 1 | 1 | 1 | 1 |
| 5 | 1 | 1 | 1 | 1 | 1 |
| ⋮ | ⋮ | ⋮ | ⋮ | ⋮ | ⋮ |

FIG. 11A

|  | RISK SECTION 1 | RISK SECTION 2 | RISK SECTION 3 | RISK SECTION 4 | RISK SECTION 5 | RISK SECTION 6 | K COEFFICIENT | RELIABILITY |
|---|---|---|---|---|---|---|---|---|
| FIRST RISK VALUE | LARGE | LARGE | MIDDLE | MIDDLE | SMALL | LARGE | 0.73 | HIGH |
| SECOND RISK VALUE | LARGE | LARGE | MIDDLE | SMALL | SMALL | LARGE | | |

FIG. 11B

|  | RISK SECTION 1 | RISK SECTION 2 | RISK SECTION 3 | RISK SECTION 4 | RISK SECTION 5 | RISK SECTION 6 | K COEFFICIENT | RELIABILITY |
|---|---|---|---|---|---|---|---|---|
| FIRST RISK VALUE | LARGE | LARGE | MIDDLE | MIDDLE | SMALL | MIDDLE | 0.52 | INTER- MEDIATE |
| SECOND RISK VALUE | LARGE | LARGE | MIDDLE | SMALL | SMALL | LARGE | | |

FIG. 11C

|  | RISK SECTION 1 | RISK SECTION 2 | RISK SECTION 3 | RISK SECTION 4 | RISK SECTION 5 | RISK SECTION 6 | K COEFFICIENT | RELIABILITY |
|---|---|---|---|---|---|---|---|---|
| FIRST RISK VALUE | MIDDLE | SMALL | LARGE | MIDDLE | SMALL | SMALL | 0.1 | LOW |
| SECOND RISK VALUE | LARGE | LARGE | SMALL | SMALL | SMALL | LARGE | | |

EVALUATING APPARATUS

CROSS-REFERENCE TO RELATED APPLICATIONS

This application is based upon and claims the benefit of priority of the prior Japanese Patent Application No. 2019-033799, filed on Feb. 27, 2019, the entire contents of which are incorporated herein by reference.

BACKGROUND

1. Technical Field

Embodiments of the present disclosure relate to an evaluating apparatus configured to perform an evaluation of a risk during traveling of a vehicle.

2. Description of the Related Art

For this type of apparatus, there is known an apparatus configured to evaluate a risk in a section in which a vehicle travels, on the basis of surrounding information (or in other words, environment information). For example, Japanese Patent Application Laid Open No. 2018-032343 (Patent Literature 1) discloses an apparatus configured to evaluate a current or future accident occurrence risk by using map information indicating topography or geographical features in a geographical area.

As in a technology/technique described in the Patent Literature 1, a risk in some location depends on the surrounding information, but a risk evaluated on the basis of only the surrounding information is not necessarily reliable. If the evaluated risk has low reliability, the evaluation result may not match a feeling of a driver of the vehicle. Specifically, there may be provided such an evaluation that there is no risk even in a place in which the driver feels a risk, or that there is a risk even in a place in which the driver feels no risk. These are technically problematic.

SUMMARY

In view of the aforementioned problem, it is therefore an object of embodiments of the present disclosure to provide an evaluating apparatus that can perform a risk evaluation that matches a driver's feeling.

An aspect of an evaluating apparatus according to the present disclosure is an evaluating apparatus configured to evaluate a risk that exists in surroundings of a road on which a vehicle travels, the evaluating apparatus provided with: a first determinator configured to determine a first risk value indicating an extent of a risk in one section of the road, on the basis of a feature value indicating driving behavior of a driver of the vehicle; a second determinator configured to determine a second risk value indicating an extent of a risk in the one section, on the basis of surrounding information about the surroundings of the road; and an acquirer configured to obtain reliability of the second risk value, by evaluating the second risk value by using the first risk value.

BRIEF DESCRIPTION OF THE DRAWINGS

FIG. 4 is a table illustrating an example of clustering of the feature values;

FIG. 6 is a table illustrating an example of a method of determining a driver type according to the point;

FIG. 7 is a table illustrating an example of a method of determining a driver type from the driver type according to the point;

FIG. 11A is a table illustrating an example of a method of evaluating reliability performed by the evaluating apparatus according to the embodiment;

FIG. 11B is a table illustrating an example of the method of evaluating reliability performed by the evaluating apparatus according to the embodiment; and FIG. 11C is a table illustrating an example of the method of evaluating reliability performed by the evaluating apparatus according to the embodiment.

DETAILED DESCRIPTION

Hereinafter, an evaluating apparatus according to an embodiment of the present disclosure will be explained with reference to the drawings.

<Configuration of Evaluating Apparatus>

Figure 1:
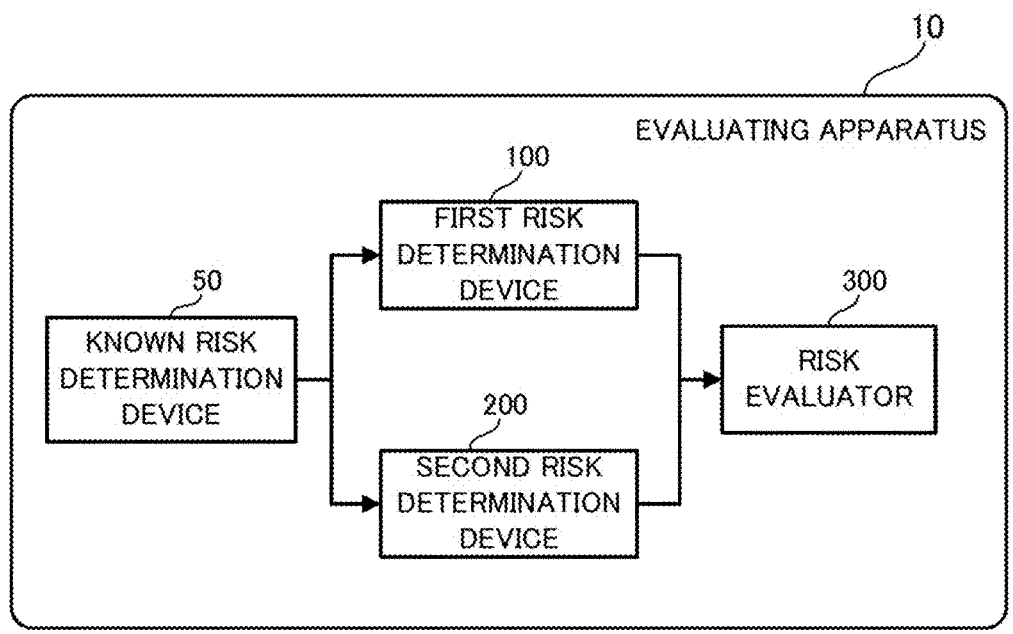
FIG. 1 is a block diagram illustrating a configuration of an evaluating apparatus according to an embodiment.

Firstly, a configuration of the evaluating apparatus according to the embodiment will be explained with reference to FIG. 1. FIG. 1 is a block diagram illustrating the configuration of the evaluating apparatus according to the embodiment.

In FIG. 1, an evaluating apparatus 10 according to the embodiment is configured to evaluate a risk (e.g., a risk of a collision, etc.) in a section in which a vehicle travels. The evaluating apparatus 10 is provided, for example, with an arithmetic apparatus, a memory, and the like. The evaluating apparatus 10 is provided with a known risk determination device 50, a first risk determination device 100, a second risk determination device 200, and a risk evaluator 300, as physical processing circuits or logical processing blocks that constitute functions thereof.

The known risk determination device 50 is configured to determine whether or not there is a known risk (e.g., an intersection, a curve, etc.) in a section that is an evaluation target, for example, from map information stored by a navigation system or the like. A detailed explanation of a method of determining the known risk will be omitted herein because the existing technologies/techniques can be adopted, as occasion demands. A section in which it is determined that there is a risk by the known risk determination device 50 may be set as a "risk section", and information about the risk section may be outputted to each of the first risk determination device 100 and the second risk determination device 200.

The first risk determination device 100 is configured to determine a first risk value, for the risk section determined on the known risk determination device 50. The "first risk value" herein may be a value indicating an extent of a risk (or in other words, degree of a risk), which is determined on the basis of driving behavior of a driver of the vehicle. The first risk determination device 100 may output the first risk value, for example, at three stages of "large", "middle", or "small". A specific method of determining (or calculating) the first risk value can adopt the existing technologies/techniques, as occasion demands, an example of which will be detailed later. A determination result (i.e., the first risk value) of the first risk determination device 100 may be outputted to the risk evaluator 300. The first risk determination device 100 is a specific example of the "first determinator" in Supplementary Notes described later.

The second risk determination device 200 is configured to determine a second risk value, for the risk section determined on the known risk determination device 50. The "second risk value" herein may be a value indicating an extent of a risk (or in other words, degree of a risk), which is determined on the basis of surrounding information about a target section. The second risk determination device 200 may output the second risk value, for example, at three stages of "large", "middle", or "small". A specific method of determining (or calculating) the second risk value can adopt the existing technologies/techniques (e.g., the technology/technique described in the Patent Literature 1), as occasion demands, and thus a detailed explanation will be omitted herein. A determination result (i.e., the second risk value) of the second risk determination device 200 may be outputted to the risk evaluator 300. The second risk determination device 200 is a specific example of the "second determinator" in Supplementary Notes described later.

The risk evaluator 300 is configured to evaluate the second risk value determined on the second risk determination device 200, by using the first risk value determined on the first risk determination device 100. Specifically, the risk evaluator 300 is configured to obtain reliability (or in other words, probability) of the second risk value, by determining agreement of the first risk value and the second risk value. A specific method of obtaining the reliability performed by the risk evaluator 300 will be detailed later. The risk evaluator 300 is a specific example of the "acquirer" in Supplementary Notes described later.

<Configuration of First Risk Determination Device>

Figure 2:
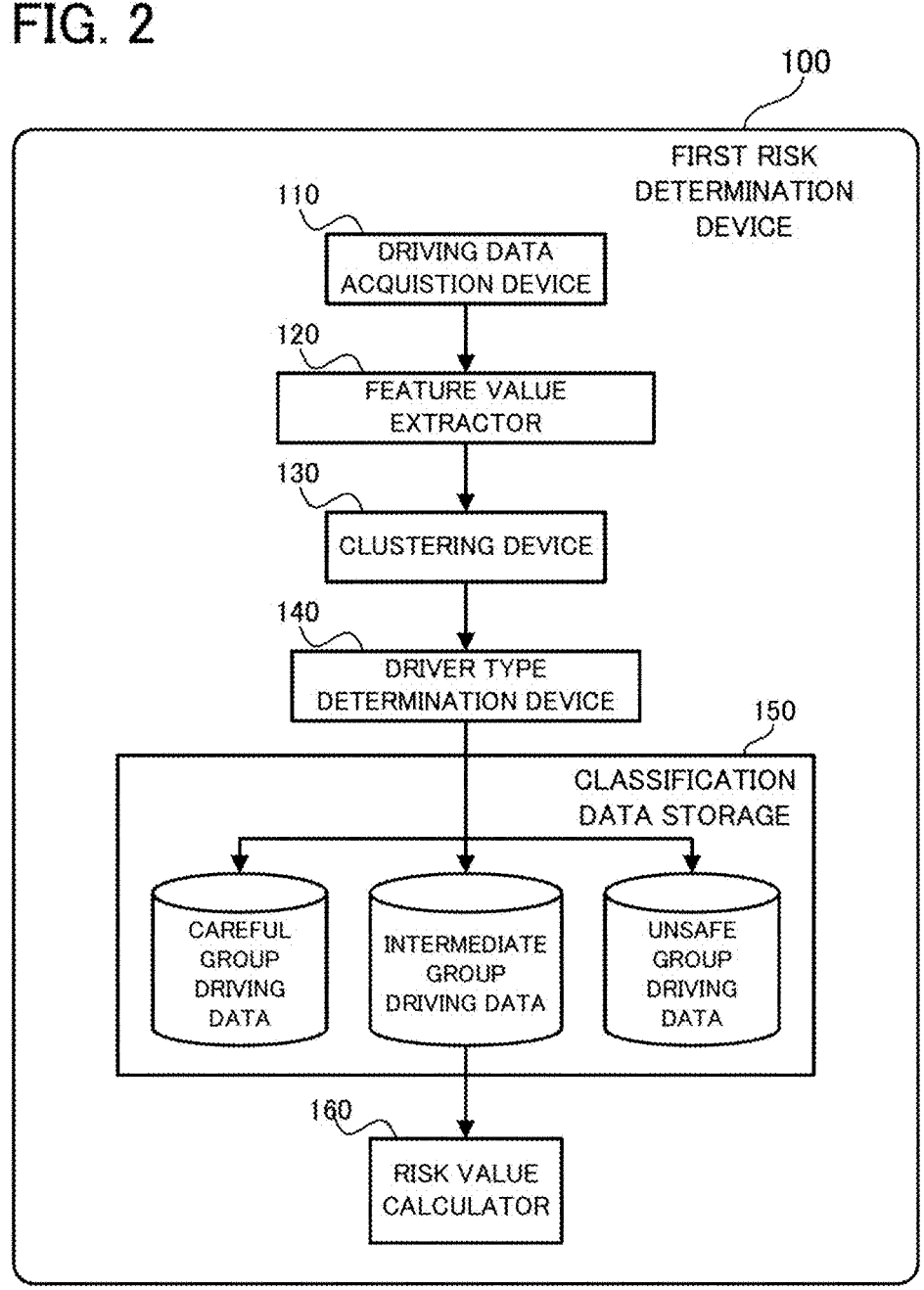
FIG. 2 is a block diagram illustrating a configuration of a first risk determination device.

Next, a specific configuration of the first risk determination device 100 will be explained with reference to FIG. 2. The first risk determination device 100 is provided with a driving data acquisition device 110, a feature value extractor 120, a clustering device 130, a driver type determination device 140, a classification data storage 150, and a risk value calculator 160, as physical processing circuits or logical processing blocks that constitute functions thereof.

The driving data acquisition device 110 is configured to obtain driving data including various parameters of a traveling vehicle and position information. The driving data acquisition device 110 is configured to obtain a plurality of driving data (which is specifically driving data obtained at a plurality of times from a plurality of vehicles (or drivers)). Moreover, the driving data acquisition device 110 according to the embodiment is particularly configured to obtain the driving data on the risk section in which it is determined that there is a risk on the known risk determination device 50. The driving data acquisition device 110 may be further configured to obtain the driving data on a non-risk section in which it is not determined that there is a risk on the known risk determination device 50.

The feature value extractor 120 is configured to obtain (or extract) a feature value indicating the driver's driving behavior, from the various parameters included in the driving data on the risk section obtained on the driving data acquisition device 110. The feature value extractor 120 may be further configured to obtain (or extract) the feature value indicating the driver's driving behavior, from the driving data on the non-risk section obtained on the driving data acquisition device 110. The feature value to be obtained by the feature value extractor 120 may be set in advance as an amount related to a driving carefulness degree, out of the parameters included in the driving data (or parameters that can be calculated by at least partially using the driving data). A specific example of the feature value obtained by the feature value extractor 120 will be detailed later. The feature value extractor 120 may be configured to obtain a plurality of types of feature values.

The clustering device 130 is configured to classify (or cluster) the feature value(s) obtained by the feature value extractor 120 from the driving data on the risk section, into a plurality of groups (or clusters) on the basis of a similarity degree of the driving behavior. In other words, the clustering device 130 is configured to perform classification such that the feature values of drivers who have similar driving behaviors in the risk section are included in the same group. A clustering method can adopt the existing technologies/techniques, as occasion demands. As an example, a WARD method can be used. Moreover, the clustering device 130 is configured to give a rank indicating the driving carefulness degree, to the plurality of clusters classified. Specifically, the clustering device 130 may give the rank to the clusters on the basis of an average value of the feature values classified into the respective clusters.

The driver type determination device 140 is configured to determine a driver type corresponding to the driving carefulness degree of the driver of the vehicle, on the basis of into which cluster each feature value is classified by the clustering device 130. The driver type determination device 140 is provided with: a first type determination device configured to determine a driver type according to the point, which is a driver type in each risk section; and a second type determination device configured to determine a final driver type from a plurality of driver types according to the point. A specific method of determining the driver type will be detailed later.

The classification data storage 150 is configured to store the driving data obtained by the driving data acquisition device 110, for each driver type. In the embodiment, an explanation is given by using such an example that the driver type determination device 140 determines the driver type of each driver, from among three driver types (e.g., a driver type with the highest driving carefulness degree, a driver type with an intermediate driving carefulness degree, and a driver type with the lowest driving carefulness degree). In this case, the classification data storage 150 is configured to store each of "careful group driving data", which is the driving data of a driver who belongs to a careful group with the highest driving carefulness degree, "intermediate group driving data", which is the driving data of a driver who belongs to an intermediate group with the intermediate driving carefulness degree, and "unsafe group driving data", which is the driving data of a driver who belongs to an unsafe group with the lowest driving carefulness degree.

The risk value calculator 160 is configured to calculate the first risk value indicating the extent of a risk in the risk section, by using the intermediate group driving data stored in the classification data storage 150. The intermediate group driving data can be estimated to be the driving data of an average driver whose driving carefulness degree is not extremely high nor low. Thus, by using the intermediate group driving data, the risk value indicating the extent of a risk in the risk section can be calculated as a value that is close to the feelings of most drivers. In other words, it is possible to prevent a value that is close to the feeling of some driver who has extreme characteristics, from being calculated. A specific method of extracting the first risk value will be detailed later.

<Operation of First Risk Determination Device>

Next, an operation of the first risk determination device 100 (i.e., an operation of calculating the first risk value) will be specifically explained.

(Extraction of Feature Values)

Figure 3:
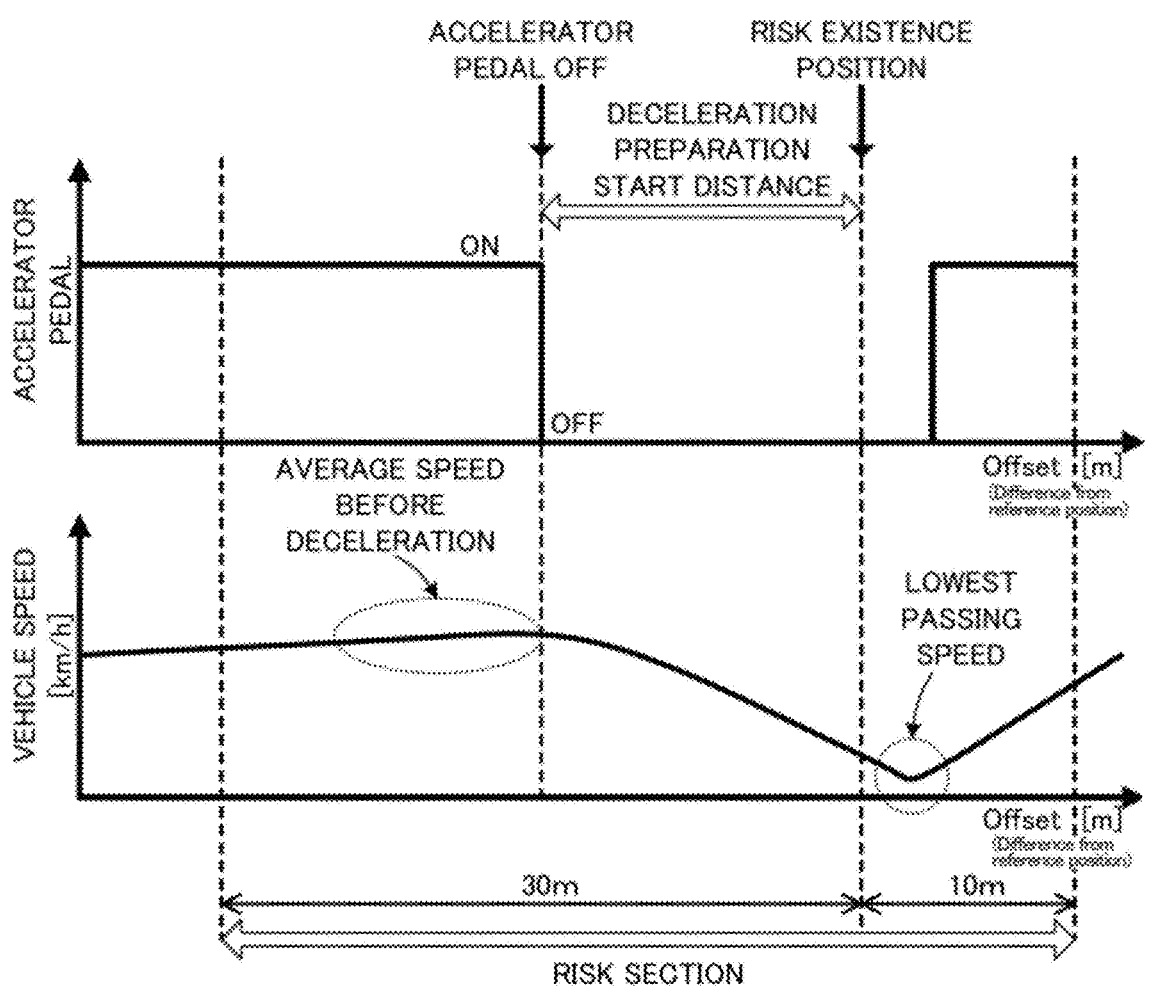
FIG. 3 is a graph illustrating an example of feature values extracted from driving data.

Firstly, an operation of extracting the feature values by the feature value extractor 120 will be explained with reference to FIG. 3. FIG. 3 is a graph illustrating an example of the feature values extracted from the driving data. FIG. 3 illustrates an accelerator pedal operation and a vehicle speed when the vehicle travels in the risk section including a risk existence position (i.e., an intersection). The risk section herein is set, for example, as a range of 30 meters on a near side of the risk existence position to 10 meters on a far side thereof.

As illustrated in FIG. 3, the following situation is presumed; when the vehicle travels in the risk section, an accelerator pedal is off (or released) before the risk existence position to start to decelerate, and after the vehicle passes the risk existence position, the accelerator pedal is stepped on to start to accelerate. The feature value extractor 120 may obtain a "deceleration preparation start distance", an "average speed before deceleration", and a "lowest passing speed", as the feature values, from the driving data of the vehicle as described above.

The deceleration preparation start distance may be a value corresponding to a distance to the risk existence position from a position in which an accelerator opening degree becomes zero last time before the risk existence position (hereinafter referred to as a "deceleration preparation start position" as occasion demands) (or in other words, the deceleration preparation start distance may be a value indicating how early an accelerator pedal is off (or released)). The average speed before deceleration may be an average speed in a fixed section immediately before the deceleration preparation start position (which is herein a 10-meter section on the near side of the deceleration preparation start position). The lowest passing speed may be the lowest value of the vehicle speed in the risk section. Each value of the feature values, which are the deceleration preparation start distance, the average speed before deceleration, and the lowest passing speed, may be obtained and then normalized (i.e., a process of making the magnitudes of the feature values uniform may be performed).

The aforementioned three feature values are merely an example, and in addition to or instead of those feature values, the feature value extractor 120 may obtain another feature value.

(Clustering of Feature Value)

Figure 5:
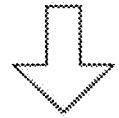
FIG. 5 is a table illustrating a method of determining a cluster rank from an average value of feature values of each cluster.

Next, an operation of clustering the feature values by the clustering device 130 will be explained with reference to FIG. 4 and FIG. 5. FIG. 4 is a table illustrating an example of clustering of the feature values. FIG. 5 is a table illustrating a method of determining a cluster rank from an average value of feature values of each cluster. An ID in FIG. 4 is an identification number given to each driver. Here, the driving data (or in other words, the feature values) shall be obtained three times for each driver.

As illustrated in FIG. 4, the clustering device 130 may classify the feature values of each driver, which is a set of three feature values (i.e., feature value 1: deceleration preparation start distance, feature value 2: average speed before deceleration, and feature value 3: lowest passing speed) obtained from one driving data, into a predetermined number of clusters. Hereafter, an explanation will be given by using such an example that the clustering device 130 classifies the feature values of each driver into three clusters (clusters 1 to 3). In the example in FIG. 4, the feature values obtained from the first driving data of a driver with ID1 are classified into the cluster 1. The feature values obtained from the first driving data of a driver with ID2 are classified into the cluster 2. The feature values obtained from the first driving data of a driver with ID3 are classified into the cluster 3.

As illustrated in FIG. 5, the clustering device 130 may calculate an average value for each cluster, from the feature values classified into three clusters. Specifically, the clustering device 130 may calculate an average value of the feature value 1 classified into the cluster 1, an average value of the feature value 2 classified into the cluster 1, and an average value of the feature value 3 classified into the cluster 1, and may calculate an overall average, which is an average of all the three feature values classified into the cluster 1, from the three average values. In the same manner, even for the cluster 2 and the cluster 3, the clustering device 130 may calculate respective average values of the feature values and overall average values.

Here, since each feature value is obtained as a parameter indicating the driving carefulness degree of the driver, the calculated overall average value corresponds to how high the driving carefulness degree is (wherein a negative number indicates a higher driving carefulness degree). Thus, the clustering device 130 may give a rank indicating the driving carefulness degree, to each cluster, on the basis of the calculated overall average value. In the example in FIG. 4, a "rank 3" indicating the highest driving carefulness degree is given to the cluster 1, a "rank 1" indicating the lowest driving carefulness degree is given to the cluster 2, and a "rank 2" indicating the intermediate driving carefulness degree is given to the cluster 3.

(Determination of Driver Type)

Next, an operation of determining the driver type by the driver type determination device 140 will be explained with reference to FIG. 6 and FIG. 7. FIG. 6 is a table illustrating an example of a method of determining the driver type according to the point. FIG. 7 is a table illustrating an example of a method of determining the driver type from the driver type according to the point. For convenience of explanation, data illustrated in FIG. 6 and FIG. 7 is data based on a specific example of the feature values, which is different from the data used in the explanation so far (e.g., the specific examples of the feature values in FIG. 3 and FIG. 4).

The data illustrated in FIG. 6 indicates into which cluster (or rank) the feature value obtained in one risk section is classified for each driver. For example, all the feature values obtained from the first, second, and third driving data of the driver with ID1 are classified into a cluster of the rank 3. All the feature values obtained from the first, second, and third driving data of the driver with ID2 are classified into a cluster of the rank 2. The feature value obtained from the first, second, and third driving data of the driver with ID3 are respectively classified into clusters of the rank 2, the rank 2, and the rank 3.

The driver type determination device 140 (or specifically, the first type determination device) may determine the driver type according to the point corresponding to the driver type in one risk section, on the basis of into what rank of cluster each feature value is classified as described above. Specifically, the driver type determination device 140 may determine the driver type according to the point of the driver, in accordance with the rank of the cluster into which the feature values are most frequently classified (or in other words, a most frequent value of the ranks classified), among a total of three times of first, second, and third times. For example, for the driver with ID1, since the classification is made to the cluster of the rank 3 all the three times, the location drive type is determined to be "3" corresponding to the rank 3. For the driver with ID2, since the classification is made to the cluster of the rank 2 all the three times, the location drive type is determined to be "2" corresponding to the rank 2. For the driver with ID3, since the classification is made to the cluster of the rank 2 twice and to the cluster of the rank 1 once, the location drive type is determined to be "2" corresponding to the rank 2.

The method of determining the location drive type using the most frequent value described above is merely an example. For example, the driver type corresponding to the rank of the cluster into which the feature value most lately obtained on a time series (the rank at the third time in the example in FIG. 6) is classified may be determined to be the location drive type. Alternatively, weighting may be performed on the rank of the classified cluster in such a manner that a more lately obtained feature value has a larger weight, and on the basis of a score calculated therefrom, the location drive type may be determined.

As illustrated in FIG. 7, after determining the driver type according to the point in each risk section, the driver type determination device 140 (or specifically, the second type determination device) may determine the final driver type from the driver type according to the point in each risk section. Specifically, the driver type determination device 140 may determine a most frequent value of a plurality of driver types according to the point determined for each driver, to be the driver type of the driver. For example, for the driver with ID1 illustrated in FIG. 7, all the driver types according to the point of the driver in a location 1 (i.e., risk section 1) to a location 4 (i.e., risk section 4) are "3", and thus, the driver type is determined to be "3". For the driver with ID2, three of the driver types according to the point of the driver in the location 1 to the location 4 are "2" and one of them is "1", and thus, the driver type is determined to be "2". For the driver with ID3, one of the driver types according to the point of the driver in the location 1 to the location 4 is "2" and three of them are "1", and thus, the driver type is determined to be "1".

When the driver type is determined as described above, the driving data of each driver may be stored in the classification data storage 150. Specifically, the driving data of the driver whose driver type is determined to be "3 (i.e., the driver type with the highest driving carefulness degree)" may be stored as the careful group driving data in the classification data storage 150. The driving data of the driver whose driver type is determined to be "2 (i.e., the driver type with the intermediate driving carefulness degree)" may be stored as the intermediate group driving data in the classification data storage 150. The driving data of the driver whose driver type is determined to be "1 (i.e., the driver type with the lowest driving carefulness degree)" may be stored as the unsafe group driving data in the classification data storage 150. As described above, the classification data storage 150 may store the driving data for each driver classified by the driver type.

(Calculation of First Risk Value)

Figure 8:
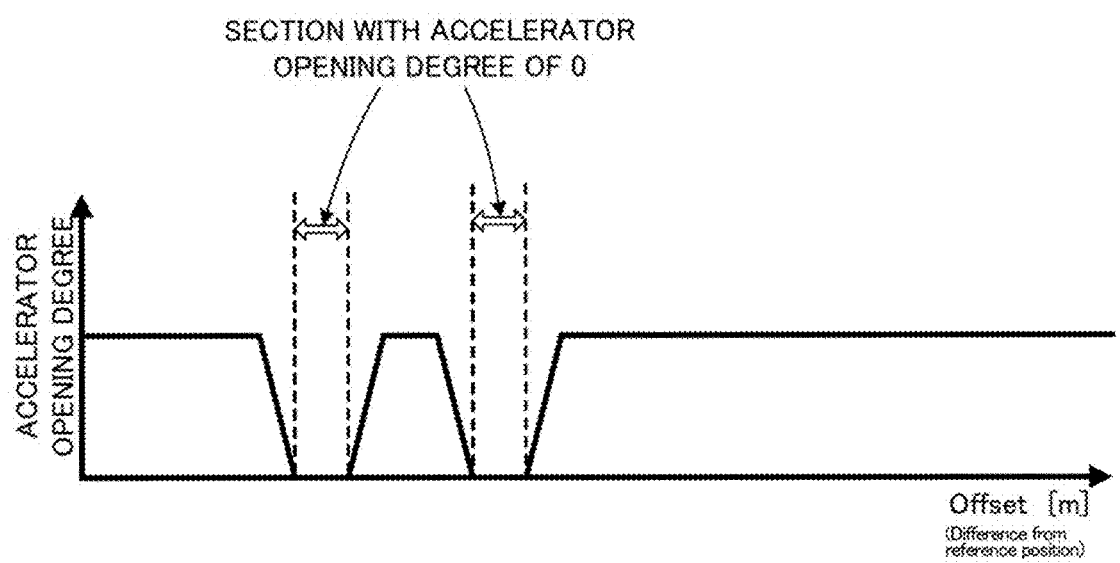
FIG. 8 is a graph illustrating a section with an accelerator opening degree of 0.
Figure 9:
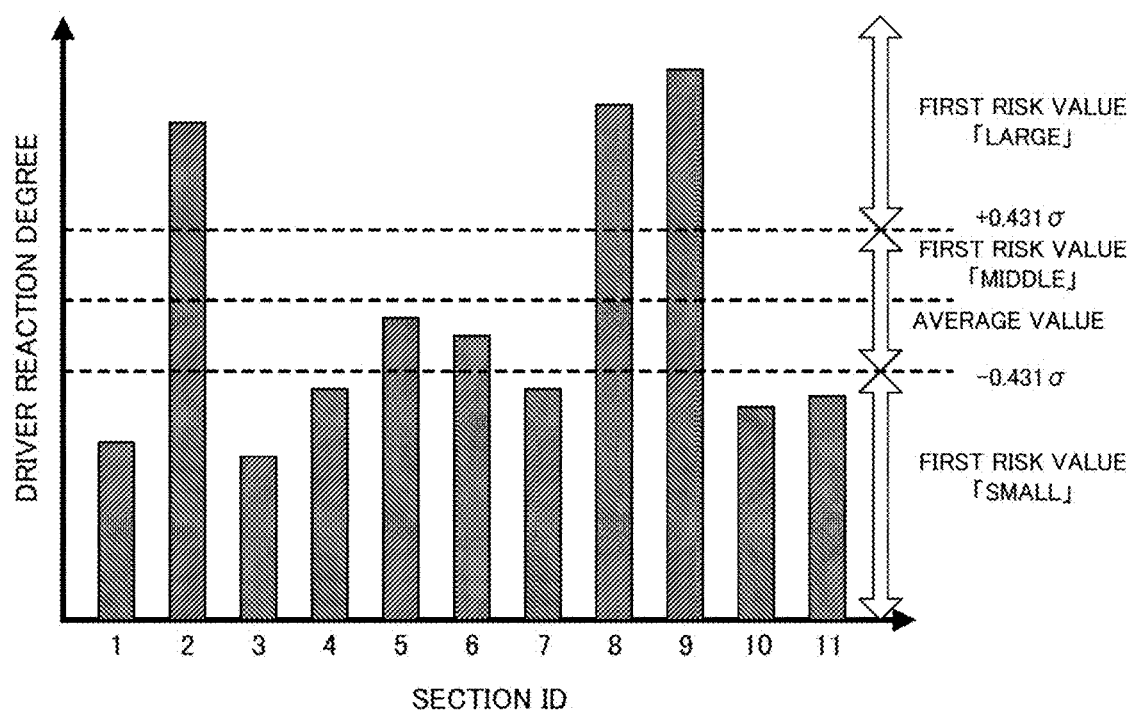
FIG. 9 is a graph illustrating an example of a method of calculating a first risk value on the basis of an accelerator off period proportion.

Next, an operation of calculating the first risk value by the risk value calculator 160 will be explained with reference to FIG. 8 and FIG. 9. FIG. 8 is a graph illustrating a section with an accelerator opening degree of 0. FIG. 9 is a graph illustrating an example of a method of calculating the first risk value on the basis of an accelerator off period proportion.

As illustrated in FIG. 8, the risk value calculator 160 may firstly obtain information about a section with an accelerator opening degree of 0, from a plurality of driving data stored as the intermediate driving data in the classification data storage 150 (i.e., the driving data of drivers of the driver type with the intermediate driving carefulness degree). The risk value calculator 160 may then calculate a proportion of drivers with an accelerator opening degree of 0 at each position (hereinafter referred to as an "accelerator off proportion" as occasion demands). The risk value calculator 160 may calculate a maximum value of the accelerator off proportion in the risk section, as reactivity of the drivers to the risk in the section (hereinafter referred to as "driver reaction degree" as occasion demands).

As illustrated in FIG. 9, the risk value calculator 160 may classify the driver reaction degree in each of sections (which are a section 1 to a section 11 herein). In the embodiment, an explanation will be given by using such an example that the risk value calculator 160 classifies the driver reaction degree in each section, into three stages, with an average value of ±0.431σ as a threshold value (i.e., into three stages on the assumption that the driver reaction degree follows a normal distribution). The risk value calculator 160 may then calculate the first risk value in a section in which the driver reaction degree is greater than +0.431σ to be "large", the first risk value in a section in which the driver reaction degree is between +0.431σ and −0.431σ to be "middle", and the first risk value in a section in which the driver reaction degree is less than −0.431σ to be "small". In the example illustrated in FIG. 9, the first risk values in the sections 2, 8, and 9 are calculated to be "large", the first risk values in the sections 5 and 6 are calculated to be "middle", and the first risk values in the sections 1, 3, 4, 7, 10 and 11 are calculated to be "small".

<Operations of Evaluating Apparatus>

Figure 10:
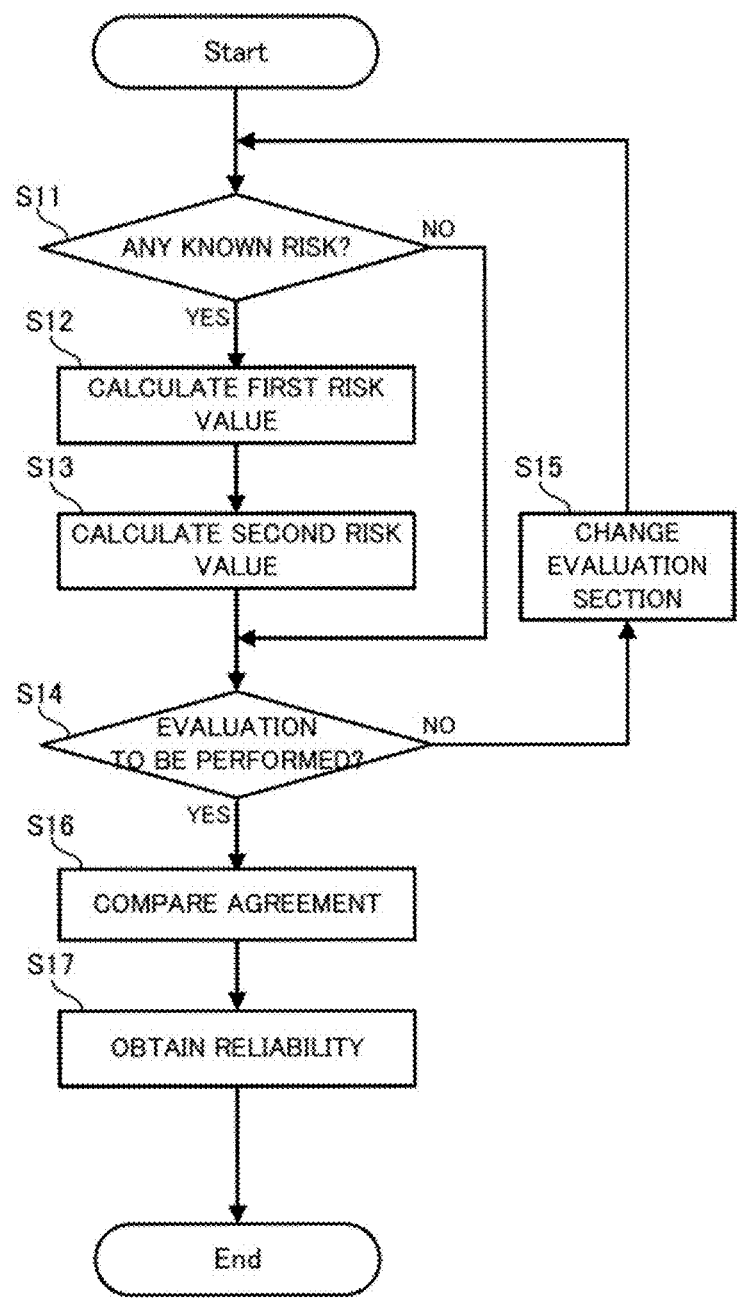
FIG. 10 is a flowchart illustrating a flow of operations of the evaluating apparatus according to the embodiment.

Next, an overall operation flow of the evaluating apparatus 10 according to the embodiment will be explained with reference to FIG. 10. FIG. 10 is a flowchart illustrating a flow of operations of the evaluating apparatus according to the embodiment.

As illustrated in FIG. 10, in operation of the evaluating apparatus 10 according to the embodiment, the known risk determination device 50 firstly determines whether or not there is a known risk in an evaluation target section (i.e., whether or not it is a risk section) (step S11).

If it is determined that there is a known risk (the step S11: YES), the first risk determination device 100 calculates the first risk value in the evaluation target section (step S12). Specifically, the first risk determination device 100 may calculate the first risk value to be any of "large", "middle", and "small". Then, the second risk determination device 200 calculates the second risk value in the evaluation target section (step S13). Specifically, the second risk determination device 200 may calculate the second risk value to be any of "large", "middle", and "small". If it is determined that there is no known risk (the step S11: NO), the step S11 and the step S12 described above are omitted.

Then, the evaluating apparatus 10 determines whether or not to perform the evaluation of the second risk value using the first risk value (step S14). Whether or not to perform the evaluation of the second risk value can be determined by whether or not the first risk value and the second risk value are obtained in a section sufficient to perform the evaluation (i.e., whether or not the number of data used for the evaluation is sufficient). If it is determined that the evaluation of the second risk value is not performed (the step S14: NO), the evaluating apparatus 10 changes the evaluation target section (step S15), and starts the process again from the step S11. By repeating the process in this manner, each of the first risk value and the second risk value is calculated in a plurality of sections.

If it is determined that the evaluation of the second risk value is performed (the step S14: YES), the risk evaluator 300 calculates the agreement of the first risk value and the second risk value (step S16). The calculation of the agreement can adopt the existing technologies/techniques as occasion demands, and can use, for example, κ coefficient.

Then, the risk evaluator 300 evaluates (or obtains) the reliability of the second risk value, from the agreement of the first risk value and the second risk value (step S17). More specifically, the risk evaluator 300 may provide such an evaluation that the reliability of the second risk value is higher as the agreement of the first risk value and the second risk value is higher.

<Specific Example of Evaluation>

Now, a specific example of the evaluation by the evaluating apparatus 10 according to the embodiment will be explained with reference to FIG. 11A to FIG. 11C. FIG. 11A to FIG. 11C are tables illustrating an example of a method of evaluating the reliability performed by the evaluating apparatus according to the embodiment.

In an example illustrated in FIG. 11A to FIG. 11C, the κ coefficient is used, wherein it is an example of the agreement of the first risk value and the second risk value. The κ coefficient may be a value calculated in a range of 0 to 1, and it may indicate that as it approaches 1 (i.e., as it increases), the agreement of the first risk value and the second risk value (or in other words, the reliability of the second risk value) is higher. Here, the reliability shall be "low" when the κ coefficient is greater than or equal to 0 and is less than 0.3, the reliability shall be "intermediate" when the κ coefficient is greater than or equal to 0.3 and is less than 0.7, and the reliability shall be "high" when the κ coefficient is greater than or equal to 0.7 and is less than or equal to 0.1.

In a case illustrated in FIG. 11A, the first risk values in risk sections 1 to 6 are respectively determined to be "large", "large", "middle", "middle", "small", and "large", whereas the second risk values in the risk sections 1 to 6 are respectively determined to be "large", "large", "middle", "small", "small", and "large" (wherein a hatched part on the table indicates a section in which the first risk value and the second risk value are calculated to be different from each other, and there is only one section here). In this case, the κ coefficient, which is calculated as a value indicating the agreement of the first risk value and the second risk value in the risk sections 1 to 6, is "0.73". Thus, the reliability of the second risk value here is evaluated to be "high".

In a case illustrated in FIG. 11B, the first risk values in the risk sections 1 to 6 are respectively determined to be "large", "large", "middle", "middle", "small", and "middle", whereas the second risk values in the risk sections 1 to 6 are respectively determined to be "large", "large", "middle", "small", "small", and "large" (wherein a hatched part on the table indicates a section in which the first risk value and the second risk value are calculated to be different from each other, and there are two sections here). In this case, the κ coefficient, which is calculated as a value indicating the agreement of the first risk value and the second risk value in the risk sections 1 to 6, is "0.52". Thus, the reliability of the second risk value here is evaluated to be "intermediate".

In a case illustrated in FIG. 11C, the first risk values in the risk sections 1 to 6 are respectively determined to be "middle", "small", "large", "middle", "small", and "small", whereas the second risk values in the risk sections 1 to 6 are respectively determined to be "large", "large", "small", "small", "small", and "large" (wherein a hatched part on the table indicates a section in which the first risk value and the second risk value are calculated to be different from each other, and there are five sections here). In this case, the κ coefficient, which is calculated as a value indicating the agreement of the first risk value and the second risk value in the risk sections 1 to 6, is "0.1". Thus, the reliability of the second risk value here is evaluated to be "low".

<Technical Effect>

Next, a technical effect obtained by the evaluating apparatus 10 according to the embodiment will be explained.

As explained in FIG. 1 to FIG. 11C, according to the evaluating apparatus 10 in the embodiment, the reliability of the second risk value may be evaluated by using the first risk value. Here, in particular, the first risk value may be a value determined on the basis of the driving behavior of the driver of the vehicle, and may be considered to be calculated as a value that is close to the driver's feeling. On the other hand, the second risk value may be a value determined on the basis of the surrounding information, and is not necessarily a value that is close to the driver's feeling. For example, even in a section in which the second risk value is calculated to be low, the driver may feel that there is a high risk, and even in a section in which the second risk value is calculated to be high, the driver may feel that there is little risk.

In the embodiment, however, the reliability of the second risk value may be evaluated on the basis of the agreement of the first risk value and the second risk value. In other words, by comparing the first risk value, which is a value that is close to the driver's feeling, with the second risk value, which is possibly separate from the driver's feeling, it is possible to evaluate to which extent the second risk value is calculated as a value that is close to the driver's feeling. If the agreement of the first risk value and the second risk value is high, it is possible to provide such an evaluation that the second risk value is calculated as a value that is relatively close to the driver's feeling (i.e., the reliability can be evaluated to be high). On the other hand, if the agreement of the first risk value and the second risk value is low, it is possible to provide such an evaluation that the second risk value is calculated as a value that is relatively separate from the driver's feeling (i.e., the reliability can be evaluated to be low).

As a result, according to the evaluating apparatus 10 in the embodiment, it is possible to perform a road risk evaluation that matches the driver's feeling. For example, if the second risk value is calculated as a value that is close to the driver's feeling, the reliability of the second risk value is evaluated to be high. In this case, the calculated second risk value is used for the road risk evaluation as it is, it is hardly separated from the driver's feeling. On the other hand, if the second risk value is calculated as a value that is separate from the driver's feeling, the reliability of the second risk value is evaluated to be low. In this case, by using the second risk value for the road evaluation with an understanding of the low reliability (e.g., by excluding the second risk value with low reliability, or by reducing the weighting), it is possible to prevent the risk evaluation that is separate from the driver's feeling, from being performed.

<Supplementary Notes>

Various aspects of embodiments of the present disclosure derived from the embodiment explained above will be explained hereinafter.

(Supplementary Note 1)

An evaluating apparatus described in Supplementary Note 1 is an evaluating apparatus configured to evaluate a risk that exists in surroundings of a road on which a vehicle travels, the evaluating apparatus provided with: a first determinator configured to determine a first risk value indicating an extent of a risk in one section of the road, on the basis of a feature value indicating driving behavior of a driver of the vehicle; a second determinator configured to determine a second risk value indicating an extent of a risk in the one section, on the basis of surrounding information about the surroundings of the road; and an acquirer configured to obtain reliability of the second risk value, by evaluating the second risk value by using the first risk value.

According to the evaluating apparatus described in Supplementary Note 1, the second risk value is evaluated by using the first risk value, and the reliability of the second risk value (i.e., probability of the second risk value) is obtained. Here, in particular, since the second risk value is a risk value determined on the basis of the surrounding information, the reliability may be low, for example, due to accuracy of the surrounding information or the like. On the other hand, the first risk value determined on the basis of the feature value indicating the driving behavior of the driver of the vehicle is calculated as a value that is close to the driver's feeling. Thus, the reliability obtained by evaluating the second risk value by using the first risk value takes into account the driver's feeling. It is therefore possible to perform a risk evaluation that matches the driver's feeling.

(Supplementary Note 2)

In an evaluating apparatus described in Supplementary Note 2, the acquirer is configured to obtain the reliability of the second risk value, on the basis of agreement of the first risk value and the second risk value.

According to the evaluating apparatus described in Supplementary Note 2, it is possible to obtain the reliability of the second risk value, easily and accurately, by using the agreement of the first risk value and the second risk value.

The present disclosure may be embodied in other specific forms without departing from the spirit or essential characteristics thereof. The present embodiments and examples are therefore to be considered in all respects as illustrative and not restrictive, the scope of the disclosure being indicated by the appended claims rather than by the foregoing description and all changes which come in the meaning and range of equivalency of the claims are therefore intended to be embraced therein.

What is claimed is:

1. An evaluating apparatus configured to evaluate a risk that exists in surroundings of a road on which a vehicle travels, said evaluating apparatus comprising:
    a first determinator configured to determine a first risk value indicating an extent of a risk in one section of the road, on the basis of a feature value indicating driving behavior of a driver of the vehicle;
    a second determinator configured to determine a second risk value indicating an extent of a risk in the one section, on the basis of surrounding information about the surroundings of the road; and
    an acquirer configured to obtain reliability of the second risk value, by evaluating the second risk value by using the first risk value.

2. The evaluating apparatus according to claim 1, wherein said acquirer is configured to obtain the reliability of the second risk value, on the basis of agreement of the first risk value and the second risk value.

* * * * *

UNITED STATES PATENT AND TRADEMARK OFFICE
CERTIFICATE OF CORRECTION

PATENT NO. : 10,807,602 B2
APPLICATION NO. : 16/797594
DATED : October 20, 2020
INVENTOR(S) : Kyoichi Tohriyama et al.

Page 1 of 1

It is certified that error appears in the above-identified patent and that said Letters Patent is hereby corrected as shown below:

On the Title Page

Item (72), inventor 1, city, delete "Yokohama" and insert --Yokohama-shi Kanagawa-ken--, therefor.

Item (72), inventor 2, city, delete "Tokyo-to" and insert --Bunkyo-ku Tokyo-to--, therefor.

Item (72), inventor 3, city, delete "Tokyo-to" and insert --Bunkyo-ku Tokyo-to--, therefor.

Item (72), inventor 4, city, delete "Tokyo-to" and insert --Bunkyo-ku Tokyo-to--, therefor.

Signed and Sealed this
Second Day of March, 2021

Drew Hirshfeld
*Performing the Functions and Duties of the*
*Under Secretary of Commerce for Intellectual Property and*
*Director of the United States Patent and Trademark Office*